(12) United States Patent
Rolland et al.

(10) Patent No.: US 10,444,069 B2
(45) Date of Patent: Oct. 15, 2019

(54) IMAGING SPECTROMETER WITH FREEFORM SURFACES

(71) Applicant: University of Rochester, Rochester, NY (US)

(72) Inventors: Jannick P. Rolland, Pittsford, NY (US); Jacob Reimers, Homestead, FL (US)

(73) Assignee: University of Rochester, Rochester, NY (US)

( * ) Notice: Subject to any disclaimer, the term of this patent is extended or adjusted under 35 U.S.C. 154(b) by 5 days.

(21) Appl. No.: 15/579,201

(22) PCT Filed: Jun. 7, 2016

(86) PCT No.: PCT/US2016/036224
§ 371 (c)(1),
(2) Date: Dec. 2, 2017

(87) PCT Pub. No.: WO2016/200816
PCT Pub. Date: Dec. 15, 2016

(65) Prior Publication Data
US 2018/0136039 A1    May 17, 2018

Related U.S. Application Data

(60) Provisional application No. 62/172,137, filed on Jun. 7, 2015.

(51) Int. Cl.
*G01J 3/28* (2006.01)
*G01J 3/02* (2006.01)
*G01J 3/18* (2006.01)

(52) U.S. Cl.
CPC ............ *G01J 3/021* (2013.01); *G01J 3/0208* (2013.01); *G01J 3/18* (2013.01); *G01J 3/2823* (2013.01)

(58) Field of Classification Search
CPC combination set(s) only.
See application file for complete search history.

(56) References Cited

U.S. PATENT DOCUMENTS 5,880,834 A    3/1999  Chrisp
6,266,140 B1 *  7/2001  Xiang .................. G01J 3/18
                                                  356/305
(Continued)

FOREIGN PATENT DOCUMENTS

CN    103900688 A    7/2014
CN    103175611 B    2/2015
EP    2 385 358 A1   11/2011

OTHER PUBLICATIONS

Huawen, Wu; Frederick G. Haibach; Eric Bergles; Jack Qian; Charlie Zhang; William Yang; "Miniaturized handheld hyperspectral imager," Proc. SPIE 9101, Next Generation Spectroscopic Technologies VII, 91010W (May 21, 2014); doi:10.1117/12.2049243.
(Continued)

*Primary Examiner* — Abdullahi Nur
(74) *Attorney, Agent, or Firm* — Thomas B. Ryan; Harter Secrest & Emery LLP

(57) ABSTRACT

Expanded performance opportunities for imaging spectrometers are described using φ-polynomial freeform surfaces in reflective and diffractive optics. The imaging spectrometers are generally of a type that include an entrance aperture for admitting radiation over a range of wavelengths, a detector array, a primary reflective optic with optical power, a secondary reflective diffractive optic, and a tertiary reflective optic with optical power for collectively imaging the entrance aperture onto the detector array through a range of dispersed positions. One or more of the primary reflective optic, the secondary reflective diffractive optic, and the tertiary reflective optic can include a φ-polynomial optical surface with no axis of symmetry and represented by a
(Continued)

function that depends on both a radial component and an azimuthal component.

24 Claims, 9 Drawing Sheets

(56) References Cited

U.S. PATENT DOCUMENTS

| | | | |
|---|---|---|---|
| 7,239,386 B2 | 7/2007 | Chrisp et al. | |
| 8,616,712 B2 | 12/2013 | Rolland et al. | |
| 10,088,681 B2* | 10/2018 | Rolland | G02B 17/0816 |

OTHER PUBLICATIONS

Reed D. Meyer, Kevin J. Kernery, Zoran Ninkov; Christopher T. Cotton; Peter Hammond; Bryan D. Statt; "RITMOS: a micromirror-based multi-object spectrometer," Proc. SPIE 5492, Ground-based Instrumentation for Astronomy, (Sep. 30, 2004); doi: 10.1117/12.549897.
Eric V. Chandler; David E. Fish; "Compact multispectral photodiode arrays using micropatterned dichroic filters," Proc. SPIE 9101, Next Generation Spectroscopic Technologies VII, 91010A (May 28, 2014); doi:10.1117/12.2053500.
E. Savio; L. De Chiffre; R. Schmitt; "Metrology of freeform shaped parts," CIRP Ann. Manuf. Technol. 56, 810-835 (2007).
Ozan Cakmakci; Brendan Moore; Hassan Foroosh; Jannick P. Rolland; "Optical local shape description for rotationally non-symmetric optical surface design and analysis," Optics Express vol. 16, No. 3, 1583-1598 (Feb. 4, 2008).
Ilhan Kaya; Kevin P. Thompson; Jannick P. Rolland; "Edge clustered fitting grids for φ-polynomial characterization of freeform optical surfaces," Optics Express vol. 19, No. 27, 26962-26974 (Dec. 19, 2011) .
G.W. Forbes, "Characterizing the shape of freeform optics," Optics Express vol. 20, No. 3, 2483-2499 (Jan. 20, 2012).
Ilhan Kaya and Jannick P. Rolland, "Hybrid RBF and local φ-polynomial freeform surfaces," Adv. Opt. Techn. vol. 2, No. 1, 81-88 (2013).
Roland V. Shack and Kevin P. Thompson, "Influence of Alignment Errors of a Telescope System on its Aberration Field," Proc. SPIE 251, Optical Alignment I, 146-153 (Dec. 31, 1980).
Kevin P. Thompson, "Description of the third-order optical aberrations of near-circular pupil optical systems without symmetry," Optical Society of America, vol. 22, No. 7, 1389-1401 (Jul. 2005).
Kevin P. Thompson, "Multinodal fifth-order optical aberrations of optical systems without rotational symmetry: spherical aberration," Optical Society of America, vol. 26, No. 5, 1090-1100 (May 2009).
Kevin P. Thompson, "Multinodal fifth-order optical aberrations of optical systems without rotational symmetry: the comatic aberrations," Optical Society of America, vol. 27, No. 6, 1490-1504 (Jun. 2010)
Kevin P. Thompson, "Multinodal fifth-order optical aberrations of optical systems without rotational symmetry: the astigmatic aberrations," Optical Society of America, vol. 28, No. 5, 821-836 (May 2011).
Kyle Fuerschbach; Jannick P. Rolland; Kevin P. Thomson; "Extending Nodal Aberration Theory to include mount-induced aberrations with application to freeform surfaces," Optics Express, vol. 20, No. 18, 20139-20154 (Aug. 27, 2012).
Kyle Fuerschbach; Jannick P. Rolland; Kevin P. Thomson; "Theory of aberration fields for general optical systems with freeform surfaces," Optics Express, vol. 22, No. 22, 26585-26606 (Nov. 3, 2014).
Kevin P. Thompson, "Beyond Optical Design: Interaction Between the Lens Designer and the Real World," IODC Proc 0554, 426-438 (Feb. 14, 1986).
Kevin Fuerschbach; Jannick P. Rolland; Kevin P. Thompson; "A new family of optical systems employing φpolynomial surfaces," Optics Express, vol. 19, No. 22, 21919-21928 (Oct. 24, 2011).
Jacob Reimers; Kevin P. Thompson; Kevin L. Whiteaker; Jannick P. Rolland; "Spectral full-field displays for spectrometers," Proc. SPIE 9293, International Design Conference (Dec. 17, 2014).
X. Prieto-Blanco; C. Montero-Orille; B. Couce; R. De La Fuente; "Analytical design of an Offner imaging spectrometer," Optics Express, vol. 14, No. 20, 9156-9166 (Oct. 2, 2006).
International Search Report and Written Opinion for PCT/US2016/036224 dated Sep. 20, 2016.
Li Xu et al: 11 Design of freeform mirrors in Czerny-Turner spectrometers to suppress astigmatism11, APP LI ED Optics, Optical Society of Amer I Ca, Washington, DC; us, vol. 48, No. 15' May 20, 2009 (May 20, 2009), pp. 2871-2879. XP001524061, ISSN: 0003-6935, DOI: 10.1364/A0.48.002871 p. 2872, right-hand column, last paragraph—p. 2873, left-hand column, last paragraph; figure 1.
Database Inspec [Online] The Institution of Electrical Engineers, Stevenage, GB; May 7, 2015 (May 7, 2015), Jia Hou et al: "Optical design of 400-IOOOnm spectral imaging system based on a single freeform mirror". XP002761601, Database accession No. 15525992 abstract & AOPC 2015: Telescope and Space Optical Instrumentation, vol. 9678, May 7, 2015 (May 7, 2015), Proceedings of the SPIE SPIE USA ISSN: 0277-786X, DOI: 10.1117/12.2199371.
Hui Zhao: Design of Fore-Optical System with Zernike Surface and High-Speed for Hyper-Spectral Imagers 11, Control, Automation and Systems Engineering (CASE), 2011 International Conference on, IEEE, Jul. 30, 2011 (Jul. 30, 2011), pp. 1-4, XP032046409, DOI: 10.1109/ CCASE.2011.5997685 ISBN: 978-1-4577-0859-6 the whole document.
Kyle H. Fuerschbach et al: "A new generation of optical systems with [phi]-polynomial surfaces", Optical Sensing II, vol. 7652, Jul. 1, 2010 (Jul. 1, 2010), p. 76520C, XP055276945, 1000 20th St. Bellingham WA 98225-6705 USA ISSN: 0277-786X, DOI: 10.1117/12.869455 ISBN: 978-1-62841-971-9 p. 2-p. 6.
Fuerschbach Kyle H et al: 11 Designing with [phi]-polynomial surf, Optical Design and Engineering IV, SPIE, 1000 20th St. Bellingham WA 98225-6705 USA, vol. 8167, No. I, Sep. 22, 2011 (Sep. 22, 2011), pp. 1-6, XP060012145, DOI: 10.1117/12.904944 [retrieved on Jan. 1, 1901] p. 1-p. 4.
Kyle Fuerschbach et al: "A new family of optical systems employing [phi]polynomial surfaces References and links", Opt. Express J. Opt. Soc. Am. A Opt. Express J. Opt. Soc. Am. A J. Opt. Soc. Am. A Appl. Opt. J. W. Figoski Opt. Express, Jan. 1, 2008 (Jan. 1, 2008), pp. 1583-1589, XP055301065, Retrieved from the Internet: URL:https://www.osapublishing.org/DirectPDFAccess/627DDA24-F114-EAID-60AA290AODFCOFBC 223769/oe-19-22-21919. pdf?da=l&id=223769&seq=O&mobile=no[retrieved on Sep. 7, 2016] p. 1-p. 4.
Ilhan Kaya: "Mathematical and Computational Methods for Freeform Optical Shape Description", Dissertation for Department of Electrical Engineering and Computer Science in the College of Engineering and Computer Science at the University of Central Florida Orlando, Florida, Fall Term 2013.
Guo Xia et al.: "Astigmatism-corrected miniature czemy-tumer spectrometer with freeform cylindrical lens", col. 10(8), 081201(2012) Chinese Optics Letters Aug. 10, 2012.
F.Z. Fang et al.: "Manufacturing and measurement of freeform optics", CIRP Annals—Manufacturing Technology 62 (2013) 823-846, (c) 2013 CIRP.
Virendra N. Mahajan et al.: "Orthonormal polynomials for hexagonal pupils", Optics Letters / vol. 31, No. 16 / Aug. 15, 2006 p. 2462-2464.
Jacob Reimers et al.: "Spectral Full-Field Displays for Spectrometers", Proc. of SPIE-OSA vol. 9293, 929300 © 2014 SPIE.
Jacob Reimers et al.: "Spectral Full-Field Displays for Spectrometers", Classical Optics 2014, OSA Technical Digest (online) (Optical Society of America, 2014), paper ITh3A.5.
Pantazis Mouroulis et al: "Optical design of a compact imaging spectrometer for planetary mineralogy", Optical Engineering 46(6), 063001 (Jun. 2007).

(56) References Cited

OTHER PUBLICATIONS

Pantazis Mouroulis et al.: "Pushbroom imaging spectrometer with high spectroscopic data fidelity: experimental demonstration", Optical Engineering 20060033919 Feb 1, 1999.
Pantazis Mouroulis et al: "Pushbroom Imaging Spectrometers Design for Optimum Recovery of Spectroscopic and Spatial Information", Applied optics. 20060034174 Jul. 1, 1999.

\* cited by examiner

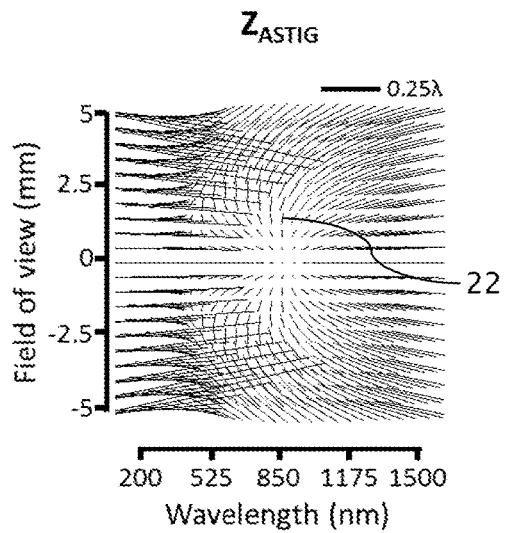 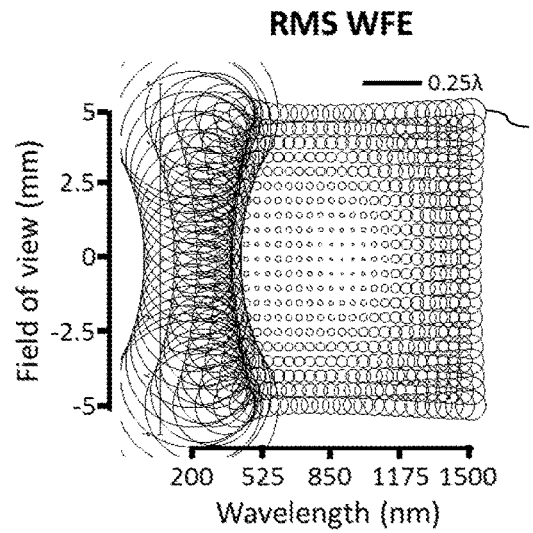
FIG. 2A  FIG. 2B
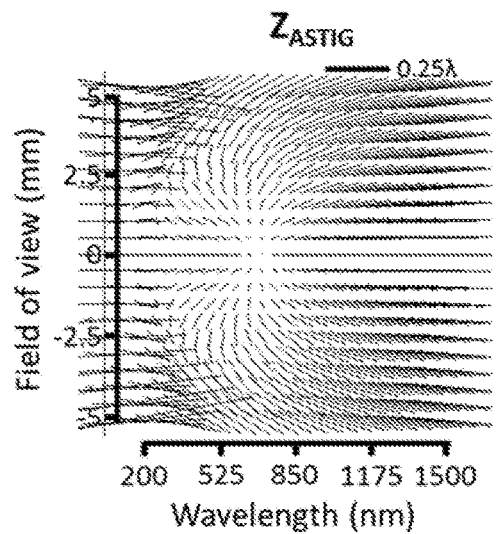 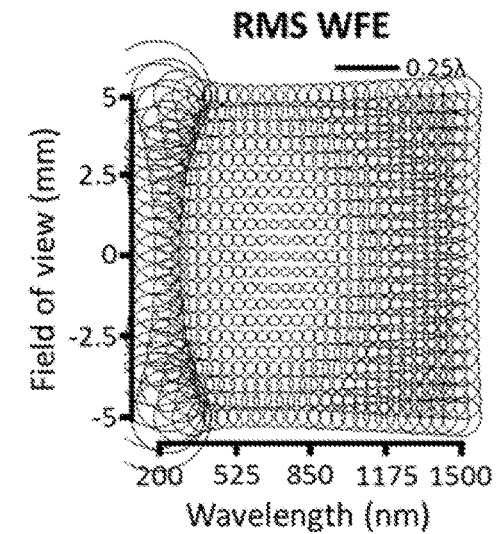
FIG. 3A  FIG. 3B

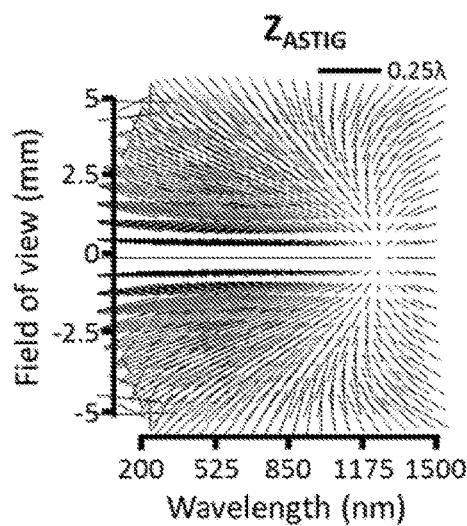
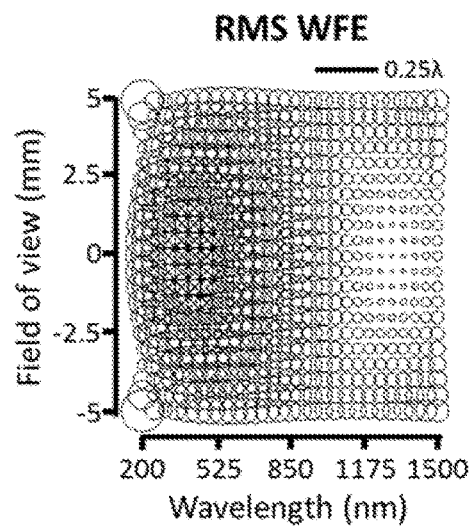
FIG. 4A          FIG. 4B
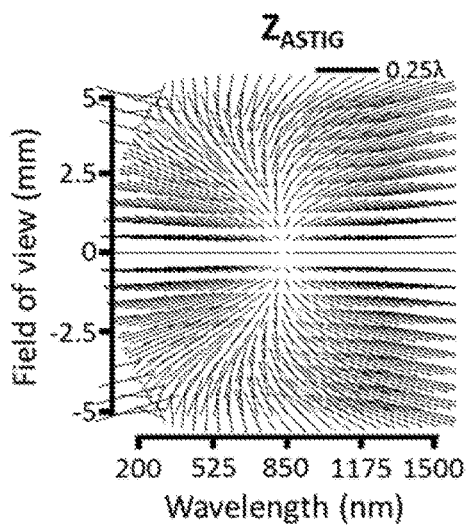
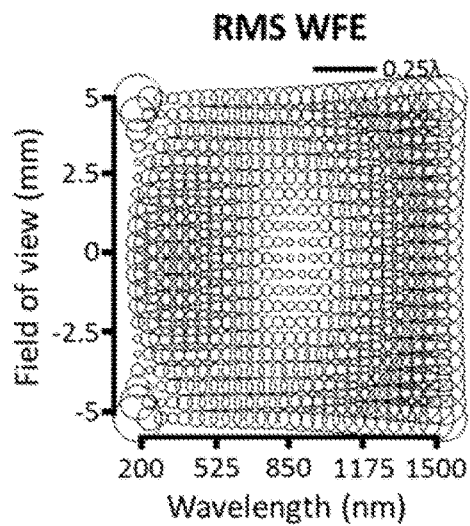
FIG. 5A          FIG. 5B

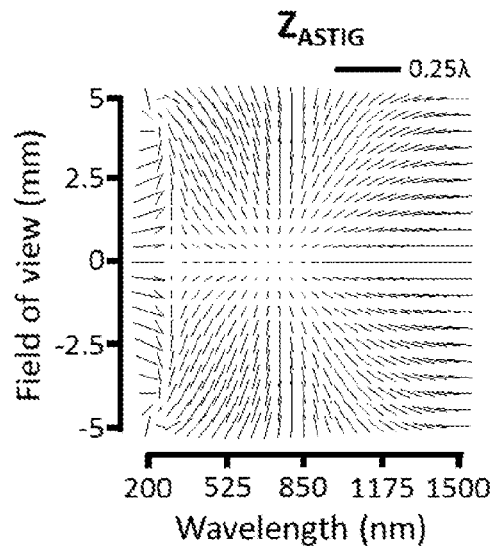 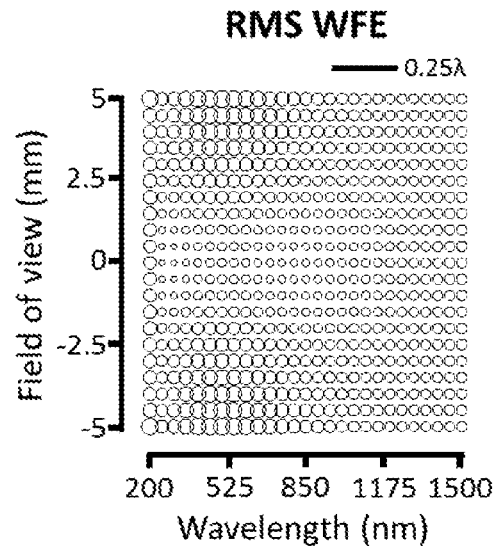
FIG. 6A          FIG. 6B
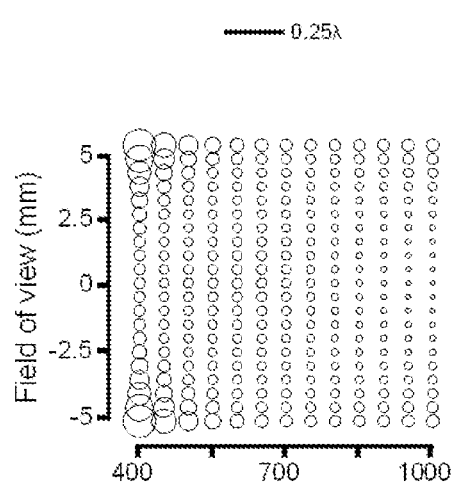 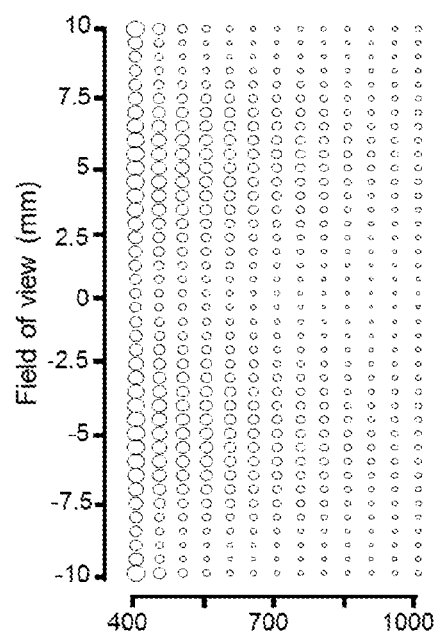
FIG. 7A          FIG. 7B

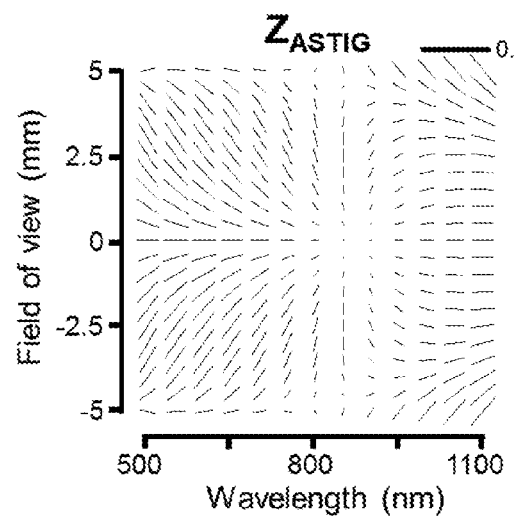 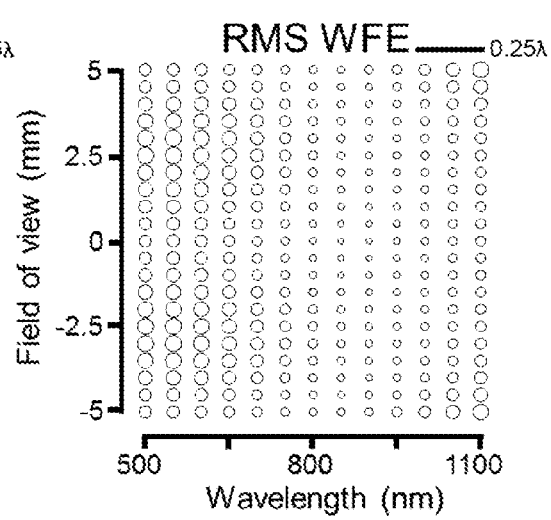
FIG. 11A                FIG. 11B
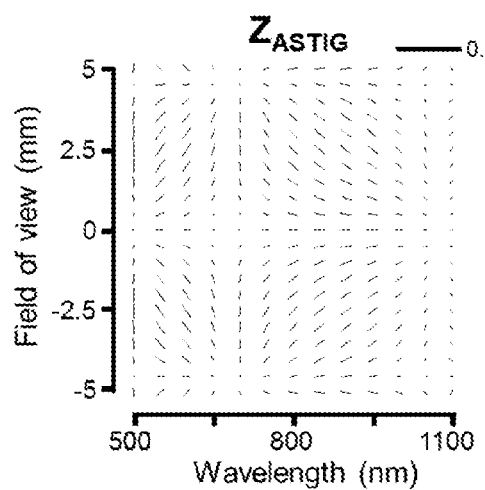 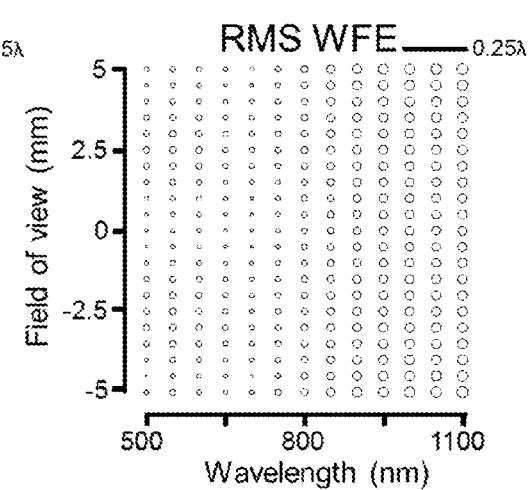
FIG. 12A                FIG. 12B

IMAGING SPECTROMETER WITH FREEFORM SURFACES

STATEMENT REGARDING FEDERALLY SPONSORED RESEARCH OR DEVELOPMENT

This invention was made with Government Support under IIP-1338877 awarded by the National Science Foundation. The Government has certain rights in the invention.

TECHNICAL FIELD

Imaging spectrometers transform wavelength information from environmental or other external sources into relatively displaced images using optics such as reflective and diffractive optics that image an input aperture onto a detector over a range of positions displaced by the dispersion produced by the diffractive optics. Well-known imaging spectrometers include the Offner-Chrisp spectrometer and the Czerny-Turner spectrometer.

BACKGROUND

High performance imaging spectrometers are in demand for use for a wide range of applications, for example, from satellite imagery to food safety. In a typical form, an imaging spectrometer images an entrance slit onto a 2D (two-dimensional) detector array where the length of the slit extends along a first of the dimensions of the 2D detector array and the dispersion created by a diffraction grating relatively displaces images of the slit in a second orthogonal dimension of the 2D detector array. Displacements of the slit images in the second dimension register the spectral content of light collected through the entrance slit.

A hyperspectral image of a scene is captured by incorporating fore-optics for imaging a slice of a scene onto the slit and translating the spectrometer in a so-called "pushbroom" manner to capture contiguous images of the scene's spatial radiance distribution. Each pixel of the scene is associated with a substantially contiguous spectrum spread over the second orthogonal dimension of the 2D detector array.

More stringent performance objectives continue to be set for imaging spectrometers such as increasing spectral range and spectral resolution, decreasing package size, and enlarging the field of view. Efforts to meet the more stringent performance objectives have led to developments utilizing technologies such as volume phase holography, digital micromirror devices (DMDs), and multispectral photodiodes. However, the improvements made possible by these new technologies have been limited or involved tradeoffs in which the performance gains achieved for one objective are offset by performance losses encountered for other objectives.

SUMMARY

The reflective and diffractive optics of imaging spectrometers that contribute optical power or dispersion can be arranged with ϕ-polynomial freeform surfaces with asymmetric surface geometries (defined as having no axis of symmetry) to enhance the performance of imaging spectrometers, such as by accomplishing spatial broadening, spectral-band broadening, and increased compactness. One or more of these performance criteria can be enhanced while the overall performance of the imaging spectrometer remains substantially diffraction limited over a field of view for the entire imaged spectrum while maintaining low distortion. According to one approach, particularly for circular apertures, the ϕ-polynomial freeform surfaces of the reflective and diffractive optics can be defined, for example, by respective Zernike polynomial terms each including a comatic component. Other mathematical forms may be more appropriate for other or a broader range of aperture shapes, including other polynomial sets and local surface descriptions such as radial basis functions and NURBS (Non-Uniform Rational B-Splines), as well as conventional orthogonal representations, such as orthonormal Legendre-type polynomials, which are particularly applicable to rectangular apertures.

The design process can be aided by the use of a spectral full field display tool for visualizing the system aberrations over the full spatial and spectral dimensions of the spectrometer's image field. The aberrations, which can also be considered in Zernike terms, can be visualized on an individual or collective basis. The design perturbations can be guided by Nodal Aberration Theory (NAT) in which the aberration fields of the imaging system are visualized for their field dependence using the spectral full field display. The magnitude and orientation (where given) of the selected aberration contribution are preferably plotted across the full spatially and spectrally dimensioned image field to visualize and support the analysis of the field dependent effects of the aberration to drive the desired optimization.

One embodiment is envisioned as an imaging spectrometer having an entrance aperture for admitting radiation over a range of wavelengths and a detector array. A primary reflective optic with optical power, a secondary reflective diffractive optic, and a tertiary reflective optic with optical power collectively image the entrance aperture onto the detector array with images of the entrance aperture displaced along a spectrally registered dimension of the detector array. At least one of the primary reflective optic, the secondary reflective diffractive optic, and the tertiary reflective optic includes a ϕ-polynomial freeform optical surface with no axis of symmetry and represented by a function that depends on both a radial component and an azimuthal component.

The ϕ-polynomial freeform optical surface can, for example, be defined by a Zernike polynomial with a comatic component, but is generally restrained to as low an order as possible for manufacturability. To more fully exploit performance enhancement possibilities, the primary reflective optic, the secondary reflective diffractive optic, and the tertiary reflective optic can each include a ϕ-polynomial freeform optical surface with no axis of symmetry. Under a set of desired conditions, individual points throughout an image field at the detector array are substantially diffraction limited with a RMS WFE of 0.1 $\lambda$ or less. Other applications may demand a RMS WFE of no more than 0.07$\lambda$.

The spectrally registered dimension of the detector array can encompass a range of wavelengths that is at least one and one-half times (but can be two to three or more times) greater than a maximum range of wavelengths that would otherwise be possible to image onto the detector array with a similar set of imaging optics having spherical reflective surfaces and requiring similar diffraction limited performance. The entrance aperture can take the form of a slit having a length and the slit can be imaged onto the detector array in an orientation at which the length of the slit extends in a spatially registered dimension of the detector array orthogonal to the spectrally registered dimension of the detector array. The spatially registered dimension of the detector array can encompass a slit length that is at least one and one-half times (but can be two to three or more times) greater than a maximum slit length that would otherwise be possible to image onto the detector array with a similar set of imaging optics having spherical reflective surfaces and requiring similar diffraction limited performance.

An optical pathway from the entrance aperture to the detector array has a volume that can be at least one and one-half times (but can be two to five or more times) less than a minimum volume that would be possible with a similar set of imaging optics having spherical reflective surfaces and requiring similar diffraction limited performance. In addition, the imaging spectrometer can have a numerical aperture NA, a slit length $L_s$, an angular dispersion $\theta_\Omega$ of the wavelengths from the secondary reflective diffractive optic (measured after the diffractive optic as the angular spread of a diffraction order under consideration), and a spectral étendue of at least 9 millimeter degrees (but can be 10 to 18 millimeter degrees) where the spectral étendue is calculated as a product of $NA \cdot L_s \cdot \theta_\Omega$.

The $\phi$-polynomial freeform optical surfaces of the primary and tertiary reflective optics can be formed as reflective surfaces. The reflective surface of the secondary reflective diffractive optic can also be formed as a $\phi$-polynomial freeform surface and the same surface can be ruled with a diffraction grating, or the functions of reflection, diffraction, and $\phi$-polynomial freeform surface formation can be distributed among two or more surfaces of the secondary reflective diffractive optic. For example, as a manufacturing expedient, the secondary reflective diffractive optic can be formed as a Mangin mirror with a transmissive component having a convex $\phi$-polynomial freeform surface and a concave spherical surface that forms a reflective grating together with a reflective component.

Another embodiment as imaging spectrometer features an entrance slit having a length $L_s$ for admitting radiation over a range of wavelengths, a detector array, and a set of optics including a primary reflective optic with optical power, a secondary reflective diffractive optic, and a tertiary reflective optic with optical power for collectively imaging the entrance slit onto the detector array through a numerical aperture NA, wherein images of the entrance slit are displaced along a spectrally registered dimension of the detector array. The reflective diffractive optic disperses the range of wavelengths through an angle $\theta_\Omega$. At least one of the primary reflective optic, the secondary reflective diffractive optic, and the tertiary reflective optic includes a freeform optical surface with no axis of symmetry. A new metric, spectral étendue, calculated as a product of $NA \cdot L_s \theta_\Omega$ further defines the imaging spectrometer as having a spectral étendue of at least 9 millimeter degrees, but as a further indicator of enhanced performance ranges or reduced optical volume, the spectral étendue could be at least 12 millimeter degrees or 15 millimeter degrees.

BRIEF DESCRIPTION OF THE DRAWING FIGURES

FIG. 2A is a spectral full field display of local astigmatic magnitudes and orientations within an image field of the spectrometer for a baseline all-spherical surface imaging spectrometer design.

FIG. 2B is a spectral full field display of root mean square wavefront errors associated with calculated aberrations within the same spatially and spectrally defined image field of the baseline all-spherical surface imaging spectrometer design.

FIG. 3A is a spectral full field display of local astigmatic magnitudes and orientations within an image field of the spectrometer for a baseline all-aspheric surface imaging spectrometer design.

FIG. 3B is a spectral full field display of root mean square wavefront errors associated with calculated aberrations within the same spatially and spectrally defined image field of the baseline all-aspheric surface imaging spectrometer design.

FIG. 4A is a spectral full field display of local astigmatic magnitudes and orientations within an image field of the spectrometer for a baseline nodally shifted all-aspheric surface imaging spectrometer design.

FIG. 4B is a spectral full field display of root mean square wavefront errors associated with calculated aberrations within the same spatially and spectrally defined image field of the baseline nodally shifted all-aspheric surface imaging spectrometer design.

FIG. 5A is a spectral full field display of local astigmatic magnitudes and orientations within an image field of the spectrometer for a baseline all-anamorphic aspheric surface imaging spectrometer design.

FIG. 5B is a spectral full field display of root mean square wavefront errors associated with calculated aberrations within the same spatially and spectrally defined image field of the baseline all-anamorphic aspheric surface imaging spectrometer design.

FIG. 6A is a spectral full field display of local astigmatic magnitudes and orientations within an image field of the spectrometer for a new $\phi$-polynomial freeform surface imaging spectrometer design.

FIG. 6B is a spectral full field display of root mean square wavefront errors associated with calculated aberrations within the same spatially and spectrally defined image field of the new $\phi$-polynomial freeform surface imaging spectrometer design.

FIG. 7A is a spectral full field display of root mean square wavefront errors within a spatially and spectrally defined image field of a baseline all-spherical surface imaging spectrometer design showing a maximum spatial field of view at which the registered errors of all points within the image field are diffraction limited.

FIG. 7B is a spectral full field display of root mean square wavefront errors within a spatially and spectrally defined image field of the new $\phi$-polynomial freeform surface imaging spectrometer design showing a maximum spatial field of view at which the registered errors of all points within the image field are diffraction limited.

FIG. 11A is a spectral full field display of local astigmatic magnitudes and orientations within an image field of the spectrometer for a new φ-polynomial freeform surface imaging spectrometer design modified by doubling the grating ruling density while maintaining the same spectral bandwidth and dispersion in the image plane and showing that the astigmatic errors remain diffraction limited throughout the image field.

FIG. 11B is a spectral full field display of root mean square wavefront errors associated with calculated aberrations within the same spatially and spectrally defined image field of the new φ-polynomial freeform surface imaging spectrometer design modified by doubling the grating ruling density while maintaining the same spectral bandwidth in the image plane and showing that the RMS wave errors remain diffraction limited throughout the image field.

FIG. 12A is a spectral full field display of local astigmatic magnitudes and orientations within an image field of the spectrometer for a new φ-polynomial freeform surface imaging spectrometer design including a Mangin grating and similarly modified by doubling the grating ruling density while maintaining the same spectral bandwidth in the image plane and showing that the astigmatic errors remain diffraction limited throughout the image field.

FIG. 12B is a spectral full field display of root mean square wavefront errors associated with calculated aberrations within the same spatially and spectrally defined image field as presented in FIG. 12A, showing that the RMS wave errors remain diffraction limited throughout the image field of the new spectrometer.

Figure 13:
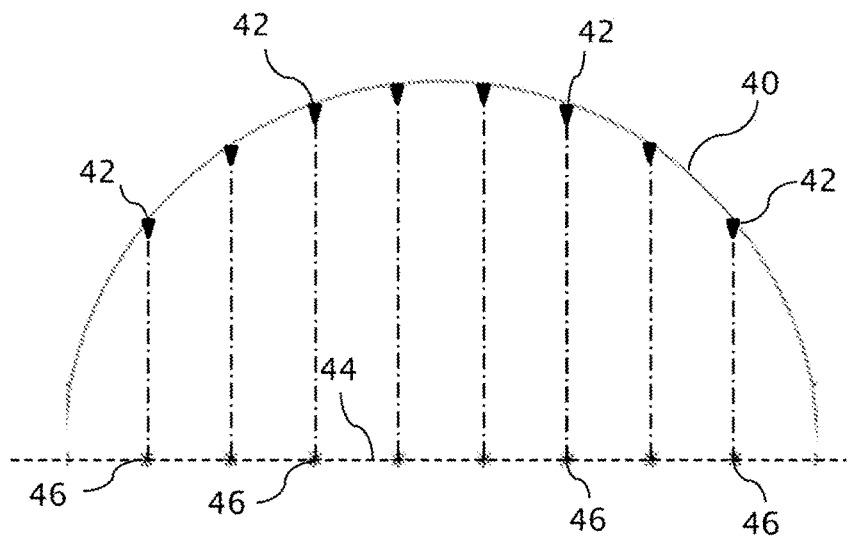

FIG. 13 is a schematic depiction of a ruled grating in a spherical surface shown with equidistant grooves in a planar projection.

Figure 14:
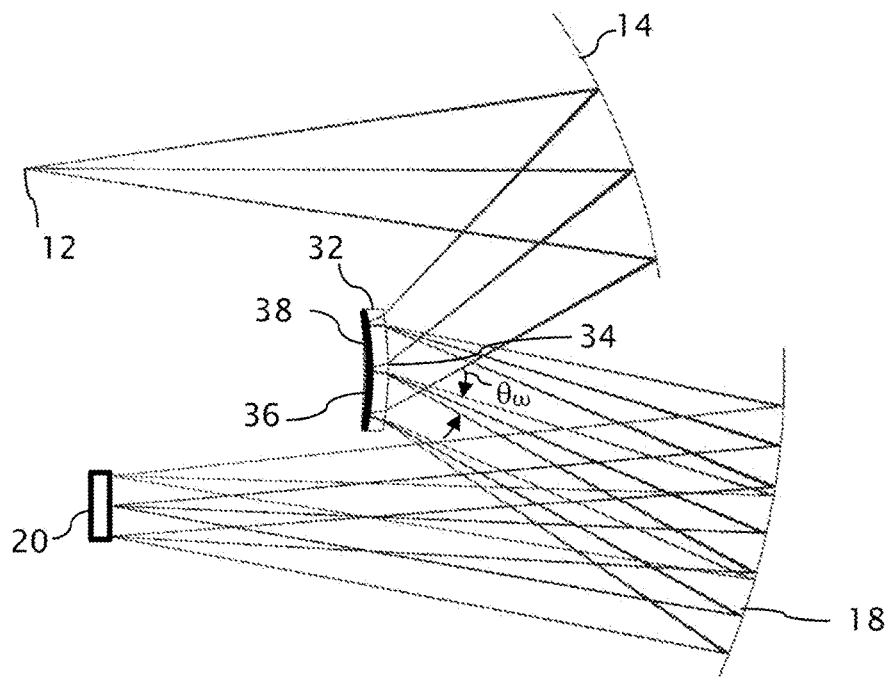

FIG. 14 a diagram of an Offner-Chrisp imaging spectrometer subject to surface adaptations of its reflective components similar to the imaging spectrometer of FIG. 1 but substituting a Mangin grating for the reflective diffractive surface depicted as a secondary optic in the prior embodiment.

Figure 15:
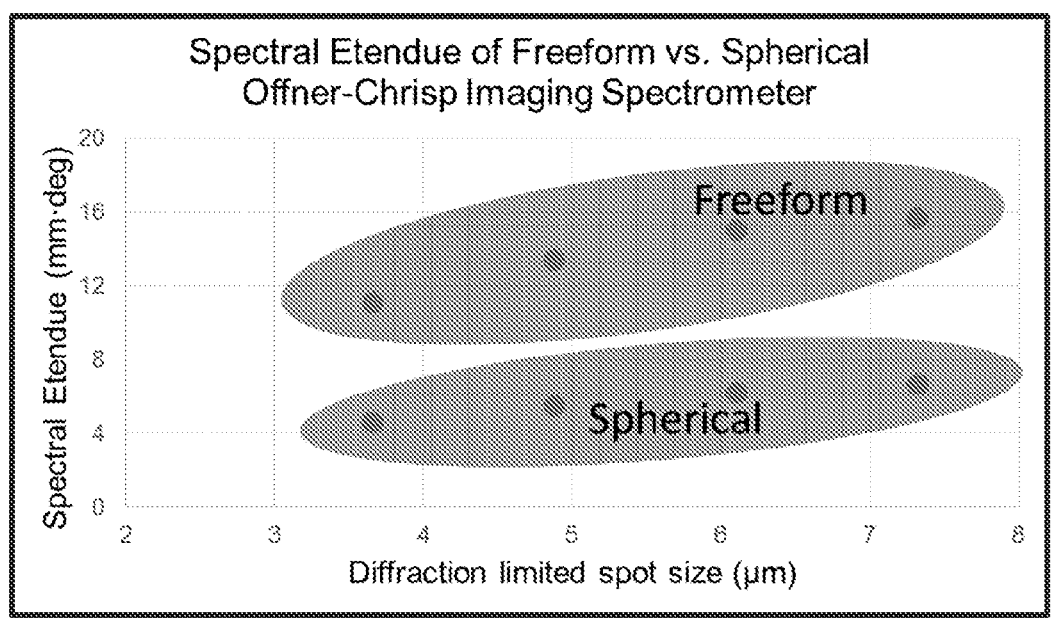

FIG. 15 charts "spectral étendue" as a new metric over a domain of diffraction limited spot sizes comparing the areas occupied by all-spherical surface imaging spectrometer designs and the new φ-polynomial freeform surface imaging spectrometer designs.

DETAILED DESCRIPTION

Figure 1A:
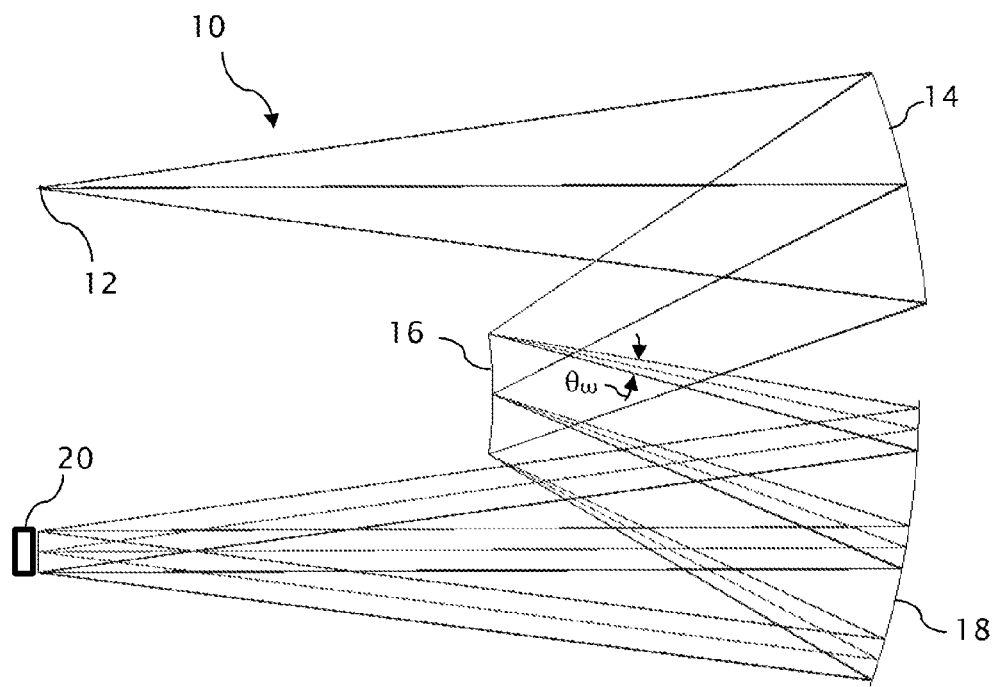
FIG. 1A is a diagram of an Offner-Chrisp imaging spectrometer subject to surface adaptations of its reflective components shown in plane that contributes a spectral dimension to an image field.

The Offner-Chrisp imaging spectrometer design form is often used in state-of-the-art imaging spectrometers for both military and civilian aerospace applications. A surface adaptation of an Offner-Chrisp imaging spectrometer 10 is depicted in FIGS. 1A and 1B as an example of a reflection-powered, grating-dispersed imaging spectrometer whose performance is envisioned to be enhanced by the incorporation of φ-polynomial freeform surfaces.

Figure 1B:
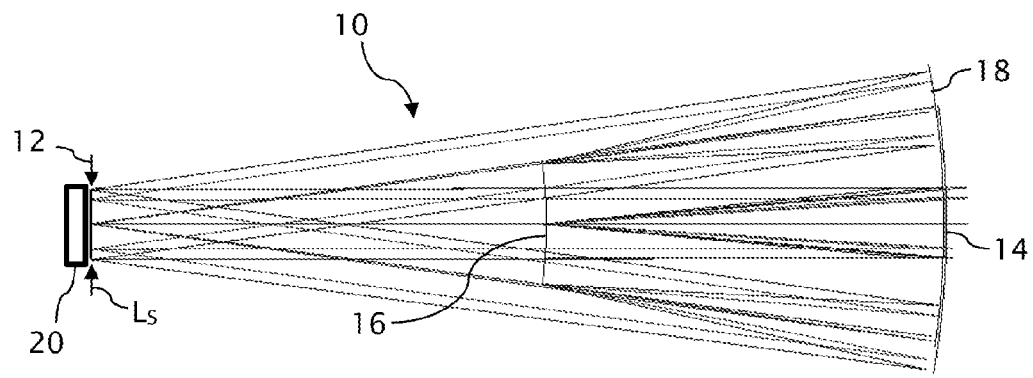
FIG. 1B is a diagram of the same imaging spectrometer in a plane in which an entrance slit appears true length for contributing a spatial dimension to the image field.

An entrance aperture in the form of a slit 12 is shown true length in the plane of FIG. 1B. A positively powered primary reflective optic 14 collects radiation (e.g., light) from the slit 12 over a range of wavelengths and reflects an incident expanding beam as a converging beam next incident upon a negatively powered secondary reflective diffractive optic 16. The negatively powered secondary reflective diffractive optic 16 reflects the incident converging beam as an expanding beam and the diffractive structure of the secondary reflective diffractive optic 16 disperses the different wavelengths within the beam. A positively powered tertiary reflective optic 18 collects the expanding dispersed beam reflected and diffracted from the secondary reflective diffractive optic 16 and reflects the incident expanding beam as a converging beam incident upon a 2D detector array 20.

In accordance with a conventional Offner relay design, the reflective optics 14 and 18 and the reflective diffractive optic 16 have nominally concentric reflective surfaces with focal lengths for imaging onto the detector array 20 with 1:1 magnification. However, in contrast to the conventional relay design, the field of view (FOV) admitted through the slit 12 is limited to substantially one dimension but the subsequent dispersion of the secondary reflective diffractive optic 16 effectively adds a second dimension to the field of view (FOV). Thus, the primary reflective optic 14 "sees" a 1D (one dimensional) FOV set by the slit 12 and the tertiary reflective optic 18 "sees" a 2D (two dimensional) FOV set by the slit 12 and the dispersion produced by the secondary diffractive optic 16. The plane of the spectral dispersion is shown in FIG. 1A, which is oriented orthogonal to the plane of the slit 12 shown in FIG. 1B.

Considered next is an F/3.8 Offner-Chrisp imaging spectrometer geometry spanning 200-1500 nm in spectral bandwidth. The particular entrance slit 12 to the spectrometer is 10 mm in length and the spectral dispersion at the focal plane is 100 nm/mm. As a first baseline for comparison, the particular reflective optics 14 and 18 and reflective diffractive optic 16 are all arranged with spherical reflective surfaces. FIGS. 2A and 2B plot performance measures using a spectral full field display (SFFD) tool in which the vertical axis of the plot corresponds to the field of view along the length dimension of the slit 12 as imaged onto the detector array 20 and the horizontal axis of the plot corresponds to an orthogonal field of view represented by a range of wavelengths imaged onto the detector array 20. A spectral full field display (SFFD) tool is described in a paper of J. Reimers, K. P. Thompson, K. L. Whiteaker, J. P. Rolland, entitled "Spectral Full-Field Displays for Spectrometers", published under Proc. SPIE 9293, International Optical Design Conference 2014, (2014), the disclosure of which paper is hereby incorporated by reference in its entirety. A spectral full field display (SFFD) tool as intended to be used herein is also described in copending U.S. Provisional Application No. 62/167,770, filed on May 28, 2015 in the names of the same inventors named herein, entitled "An Imaging Spectrometer Design Tool for Evaluating Freeform Optics," which provisional application is incorporated in its entirety as an attached addendum.

While astigmatism is minimized for a central wavelength, astigmatism can be recognized as the limiting aberration of the baseline all-spherical surface design. Zernike astigmatism is plotted in FIG. 2A. Symbols 22 provide visual indications of both the magnitudes and orientations of modeled local astigmatism throughout the image field. The symbols 22 shown in FIG. 1A are lines having respective lengths corresponding to the magnitudes of the local astigmatic aberration (scaled to 0.25λ or 25 percent of the local wavelength) and respective orientations corresponding to the orientations of the local astigmatic aberrations in the different depicted positions of the image field. Root mean square wavefront error (RMS WFE) is plotted in FIG. 2B. The RMS WFE of FIG. 2B is plotted in a local magnitudes alone with symbols 24 in the form of circles having diameters that are also scaled at 0.25λ. Particularly at the shorter wavelengths, the errors greatly exceed any reasonable diffraction limit.

As another baseline for comparison, the particular reflective optics 14 and 18 and reflective diffractive optic 16 are all arranged with aspheric reflective surfaces. Two different aspheric formulations are considered. The first aspheric formulation includes rotationally symmetric aspheric coefficients. FIGS. 3A and 3B show the resulting performance using (A-B) aspheric coefficients on each of the surfaces. Note the RMS WFE continues to dominate the performance in the UV region. In the second aspheric formulation, the astigmatic nodal region is shifted, varying the same aspheric coefficients as previously. As shown in FIGS. 4A and 4B the shifted astigmatic nodal region decreased the maximum RMS WFE by over 50 percent, similar to changing the central wavelength (where the astigmatism is minimized) during first order design; with the added benefit of retaining the first order properties and packaging without redesigning the entire system. However, the average RMS WFE remains unchanged (actually increasing slightly).

As a further baseline for comparison, the particular reflective optics 14 and 18 and reflective diffractive optic 16 are arranged with anamorphic aspheric (biconics) reflective surfaces. Anamorphic aspheres are sometimes described as freeforms but it is important to distinguish anamorphic aspheres/biconics from true freeform (comatic) surfaces in the context of optical design. FIGS. 5A and 5B show the subsequent performance when each of the optical surfaces has been extended to a biconic surface and optimized. The overall average RMS WFE shows little improvement over the use of nodally shifted aspheric surfaces.

However, remarkable performance improvements have been found by defining surfaces of the reflective optics 14 and 18 and reflective diffractive optic 16 as freeform surfaces defined in Zernike polynomial terms, which are considered exemplary of so-called "(phi) φ-polynomials," which are known to include gradient orthogonal Q-polynomials. A φ-polynomial freeform surface takes the form:

$z=F(\rho,\phi)$, where the sag, z, is represented by a function that depends on a radial component, ρ, and an azimuthal component, φ, within the aperture of the optic.

According to an exemplary embodiment, a φ-polynomial surface for the reflective optics 14 and 18 and reflective diffractive optic 16 is a Zernike polynomial surface described by the following equation:

$$z(x, y) = \frac{c\rho^2}{1 + \sqrt{1 - (1+k)c^2\rho^2}} + \sum_{j=1}^{n} C_j Z_j$$

where z is the sag of the surface, c is the vertex curvature, k is the conic constant, ρ is the normalized radial component in the aperture, $Z_j$ is the $i^{th}$ Zernike polynomial, and $C_j$ is the magnitude coefficient of $Z_j$. Each $Z_j$ is a polynomial in normalized polar coordinates (ρ and φ), where ρ is a quantity normalized to a radius $R_{norm}$, that is, $\rho=R/R_{norm}$. A table summarizing the Zernike polynomials can be found in Synopsys Inc., "Zernike Polynomials," in CODE V Reference Manual, (2011), Volume IV, Appendix C. The use of φ-polynomial surfaces for correcting aberrations can follow the general design process disclosed in U.S. Pat. No. 8,616,712 of Rolland et al., entitled "Nonsymmetric Optical System and Design Method for Nonsymmetric Optical System," the disclosure of which patent is hereby incorporated by reference in its entirety.

The spectrometer performance with the reflective surfaces of reflective optics 14 and 18 and reflective diffractive optic 16 defined as φ-polynomial surfaces is shown in FIGS. 6A and 6B, which is notably diffraction limited over the entire slit field of view and spectral band. Note that while the conventional aspheric surface approaches presented here did not appreciably decrease the average RMS WFE over the performance space, the use of φ-polynomial surfaces resulted in an average RMS WFE decrease of 65%. The comparison of the all-spherical, aspheric, and φ-polynomial F/3.8 designs is summarized in Table 1 below.

TABLE 1

Comparison of performance between designs

|  | All-spherical | Aspheres | Aspheres with nodal shift | Anamorphic aspheres | φ-polynomials |
| --- | --- | --- | --- | --- | --- |
| Max RMS WFE (waves) | 0.894 | 0.434 | 0.254 | 0.200 | 0.066 |
| Average RMS WFE (waves) | 0.114 | 0.107 | 0.116 | 0.125 | 0.040 |
| % decrease in average RMS WFE compared to all-spherical | N/A | 6 | −1 | −9 | 65 |

For further highlighting the performance advantages of φ-polynomial designs in comparison to an all-spherical baseline design, the image spectrum was limited to a range of 400 nm to 1000 nm with astigmatism minimized at 700 nm. Both the all-spherical and the φ-polynomial F/3.8 designs were pushed to design limits at which all wavelengths and fields (i.e., all field points) remained diffraction limited (<0.07λ RMS WFE) by incrementally increasing the slit field of view, i.e., the slit length.

The all-spherical design reached the diffraction limit at a slit length of 10 mm as shown in FIG. 7A. However, as shown in FIG. 7B, the φ-polynomial design did not reach the diffraction limit until a slit length of 20 mm. Similar increases in slit length have been found for a range of varying F-numbers. Each time, the φ-polynomial showed an approximately twofold increase in the diffraction limited slit field of view over the all-spherical design. This performance improvement can be referred to as "spatial broadening."

Figure 8A:
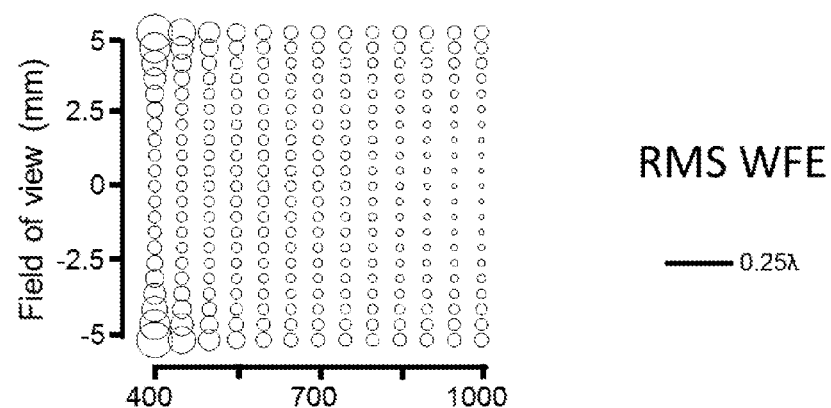
FIG. 8A is a spectral full field display of root mean square wavefront errors within a spatially and spectrally defined image field of a baseline all-spherical surface imaging spectrometer design showing a maximum spectral field of view at which the registered errors of all points within the image field are diffraction limited.
Figure 8B:
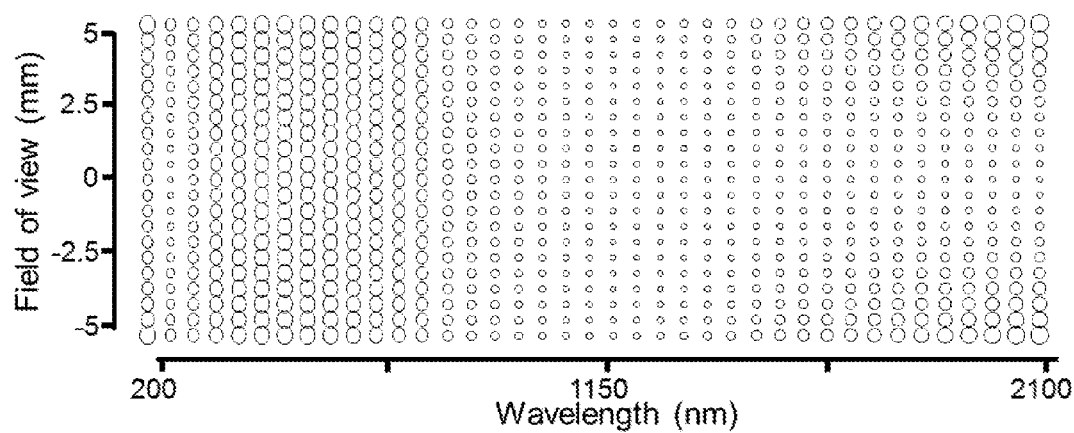
FIG. 8B is a spectral full field display of root mean square wavefront errors within a spatially and spectrally defined image field of the new $\phi$-polynomial freeform surface imaging spectrometer design showing a maximum spectral field of view at which the registered errors of all points within the image field are diffraction limited.

In a similar fashion, the performance advantages of φ-polynomial designs in comparison to an all-spherical baseline design can be demonstrated by improvements in the spectral bandwidth of the imaging spectrometer. Here, the spatial field was fixed at a slit length of 10 mm and the spectral bandwidth (i.e., the spectral field of view) was increased incrementally until reaching the referenced diffraction limit for one or more points in the image field. FIG. 8A and 8B compare the performance results of incrementally optimized all-spherical and φ-polynomial F/3.8 designs. The φ-polynomial design maintained diffraction-limited performance over a relative increase in spectral bandwidth from the 600 nm maximum achieved by the all-spherical design to 1900 nm. Thus, the φ-polynomial spectrometer design achieved a more than three-fold increase in the imaged spectral bandwidth over the all-spherical spectrometer design while all of the points in the image field were maintained within the designated diffraction limited wavefront error. This optimization was also repeated for φ-polynomial spectrometer designs over a range of varying F-numbers, and each time, the φ-polynomial design achieved at least a threefold increase in the spectral bandwidth over the all-spherical design for diffraction limited systems. This performance improvement can be referred to as "spectral-band broadening."

Distortion is also a considered metric for imaging spectrometers. Often, optical designers must make a compromise between achieving high optical performance and low distortion. The two main types of distortion in an imaging spectrometer are "spectral smile" and "spatial keystone." Both types of distortion can be measured at the image plane with respect to centroid positions for given wavelengths/fields. Spectral smile can be calculated at each wavelength as the maximum deviation from the average x-centroid position for each field. Spatial keystone can be calculated at each field as the maximum deviation from the average y-centroid position for each wavelength.

In the various benchmark designs using aspheric surfaces, optical performance in terms of limiting RMS WFE provided the guiding metric. However, these aspheric designs resulted in dramatically higher smile/keystone than the baseline all-spherical design due to the necessary compromise in distortion to attain the highest optical performance. The φ-polynomial spectrometer designs can be optimized for optical performance with or without distortion limiting constraints. For example, distortion can be constrained to <0.1 μm for both smile and keystone (<1% of a 10 μm pixel). The distortion corrected design results in different surface departures, while the optical performance remains diffraction limited for all wavelengths and fields.

Figure 9:
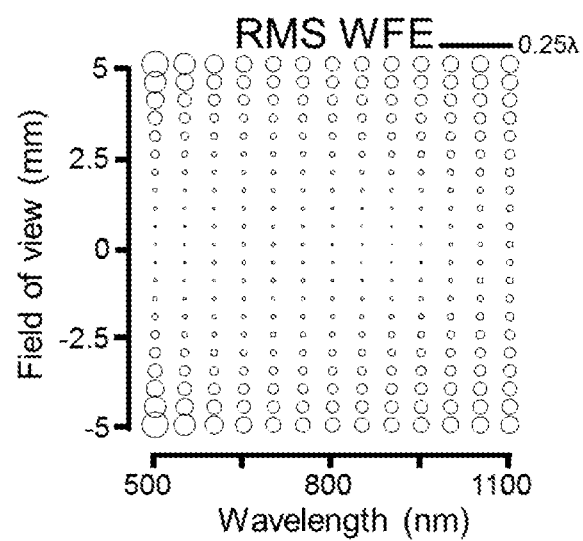
FIG. 9 is a spectral full field display of root mean square wavefront errors within a spatially and spectrally defined image field of a baseline all-spherical surface imaging spectrometer design having a given grating ruling density and optical volume wherein the registered errors of all points within the image field remain diffraction limited.

Another design improvement in form factor has been benchmarked against an all-spherical F/3.8 Offner-Chrisp imaging spectrometer geometry spanning 500-1100 nm in spectral bandwidth. The entrance slit is 10 mm in length and the spectral dispersion is 100 nm/mm. The diffraction grating of the reflective diffractive optic 16 is written with 150 lines/mm, resulting in (a) a total volume of the optical pathway through the interferometer from the entrance slit 12 to the detector array 20 of 530 cm³ and (b) a satisfactory diffraction limited performance as shown in FIG. 9. The optical pathway contains all of the routes by which light entering through the slit 12 contributes to forming an image of the slit 12 on the detector array 20.

The groove spacing on the diffraction grating of the reflective diffractive optic 16 measured here in lines per millimeter is generally chosen based on the spectral dispersion and the physical dimensions of the focal plane. This is because the diffraction grating of the reflective diffractive optic 16 creates spectral field of view, and these "spectral fields" (wavelengths) follow the imaging equation y =f tan(θ), where y is the height of a ray mapped onto the detector, f is the focal length of the optics between the grating and the detector, and θ represents the angles of the diffracted rays with respect to the central wavelength that create a range of fields of view for the optics that follow the grating. By changing the diffraction grating of the reflective diffractive optic 16 to be more dispersive, the focal length, f, generally undergoes a corresponding reduction so as to image equivalently both spatially and spectrally on the focal plane of the detector array 20.

Figure 10:
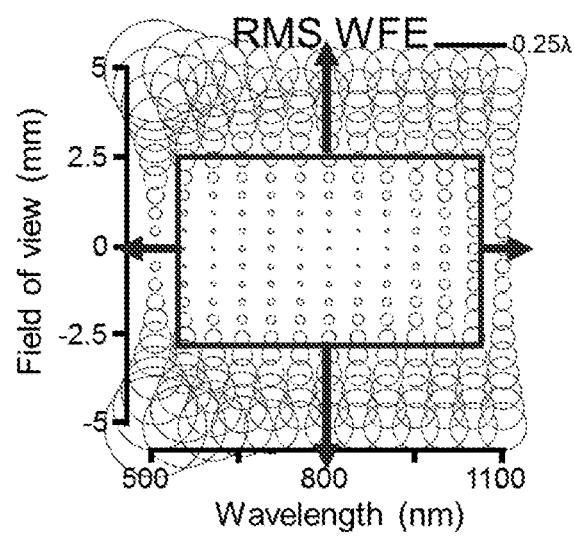
FIG. 10 is a spectral full field display of root mean square wavefront errors within a spatially and spectrally defined image field of the baseline all-spherical surface imaging spectrometer design modified by doubling the grating ruling density while maintaining the same spectral bandwidth in the image plane and showing the reduced area within the image field that remains diffraction limited.

With the objective to decrease weight/package size, the diffraction grating of the reflective diffractive optic 16 is made more dispersive by increasing the groove density to 300 lines/mm and the focal length of each curved surface appropriately reduced to retain the same focal plane dimensions. This approach and solution result in a significant reduction in the volume of the optical pathway from 530 cm³ to only 100 cm³, but the performance of the all-spherical design suffers as shown in FIG. 10. The system is far from diffraction limited for most of the desired field of view in both the spatial and the spectral dimensions. Decreasing the effective focal length means that reflective optics operate at a much faster F/number than in the nominal all-spherical system—which leads to much larger surface aberration contributions (particularly from field dependent aberrations such as the limiting aberration, astigmatism). It should be noted that in this new configuration, the field bias was changed in order to retain the ring field balance between 3rd and 5th order astigmatism. Within the plot of FIG. 10, the region contained inside the box is diffraction limited, and the desired performance bounds are indicated by the arrows necessitating both spatial and spectral-band broadening.

To achieve the desired spatial and spectral-band broadening within a diffraction limited system over the entire field of view for the full spectrum, each of the reflective optics 14 and 18 and reflective diffractive optic 16 was designed with a φ-polynomial freeform surface to mitigate SFFD observable aberrations in an optimization using NAT and low-order Zernike polynomial surface descriptions to minimize slope and surface departures. The optical performance achieved by the compact, φ-polynomial freeform Offner-Chrisp imaging spectrometer is given in FIGS. 11A and 11B both in terms of the limiting astigmatism aberration and in the overall RMS WFE.

The compact freeform spectrometer design for achieving the results of FIGS. 11A and 11B has φ-polynomial freeform contributions from each of the reflective surfaces of the reflective optics 14 and 18, including from the reflective surface of the reflective diffractive optic 16, which is also ruled to form a diffraction grating. While PerkinElmer has successfully ruled gratings on aspheric surfaces for years, the manufacturing cost of ruling φ-polynomial freeform surfaces may be quite high. The benefit of aberration correction by having φ-polynomial contributions at/near the stop is considerable but depending on the application, may not be required. One approach to ruling the grating on the φ-polynomial surface of a substrate would be to rule the grating on a spherical substrate such that the blazed grooves are equidistant in the projected flat plane and then form a nominally flat window with moderate φ-polynomial aberration correction terms polished in. For example, FIG. 13 shows an a spherical surface 40 with schematic grooves 42 arranged equidistantly in a projection plane 44 in positions indicated by stars 46. This provides the benefit of having a φ-polynomial surface at the stop without the complexity of manufacturing a grating on a φ-polynomial surface of a substrate.

Alternatively, as shown in FIG. 14, a spherical substrate for the grating and a φ-polynomial surface can be combined at the stop by choosing a transmissive component 32 having a convex front side surface 34 formed as a φ-polynomial surface and a spherically concave back side surface 36 ruled with a grating. A reflective component 38 is appended to the back side surface 36 of the transmissive component 32, such as by deposition, producing a reflective diffractive optic within the overall structure of a Mangin mirror. As such, this configuration can be referred to as a "Mangin grating."

Of note is that the front-side φ-polynomial surface of the transmissive component 32 is used in a double-pass mode and especially when the transmissive component 32 is formed with a high index material, such as ZnS, the required φ-polynomial surface departure from a spherical form is significantly reduced. The optical performance for the compact (100 cm$^3$), φ-polynomial Offner-Chrisp spectrometer with a Mangin grating is given in FIGS. 12A and 12B. The performance is diffraction limited over the entire field of view for the full spectrum.

As a way to summarize the various performance improvements made possible by the φ-polynomial spectrometer designs, a new metric called "spectral étendue" has been defined to quantitatively visualize the new optical design space that φ-polynomial surfaces have opened. Étendue, in the classical sense, quantifies the amount of light that passes through an optical system. It is the product of the area of the source and the solid angle that the entrance pupil subtends as seen by the source. In the case of an imaging spectrometer, spectral étendue accounts for the entrance slit length, the spectral bandwidth, and the F/number of the optical system and is defined by the following equality:

$$\text{spectral étendue} = NA \cdot L_s \cdot \theta_{1o6}$$

where NA is the numerical aperture, $L_s$ is the slit length, and $\theta_\Omega$ is an angular dispersion of the wavelengths from the a secondary reflective diffractive optic 16 (measured after the diffractive optic as the angular spread of a diffraction order under consideration).

Measures of spectral étendue allow comparisons between different forms of pushbroom imaging spectrometers with a single quantity that summarizes performance and design characteristics. In addition, the spectral étendue is affected by spatial and spectral-band broadening, as well as by increased compactness, to collectively quantify the benefits of φ-polynomial spectrometer designs over spherical, aspheric, anamorphic, or anamorphic aspheric designs which are unaccounted for in classical étendue. For example, a reduction in optical volume is associated with increases in numerical aperture NA, spatial broadening is associated with increases in slit length $L_s$, and spectral-band broadening is associated with increases in the range of angular dispersion $\theta_\Omega$. FIG. 15 shows the new design space afforded by φ-polynomial optics in imaging spectrometers both in increased performance and compactness.

Although described with respect to an Offner-Chrisp imaging spectrometer, the referenced improvements and corrective effects can be applied to a variety of imaging spectrometers including notably Czerny-Turner imaging spectrometers. The alternatives can include additional reflective, diffractive, or even refractive optics or elements for creating at least a spectrally dimensioned image field.

The performance improvements and corrective effects made possible by the use of φ-polynomial optical surfaces can be combined with other improvements and corrections including the use of additional surfaces or optics. The φ-polynomial optical surfaces can also be incorporated into additional optics. The reflective optics, including the reflective diffractive optic, can incorporate the φ-polynomial optical surfaces directly in a reflective surface or in another optical surface such as the surface of a transmissive component coupled to the reflective surface. The diffraction grating of the diffractive optic is preferably formed in the reflective surface of the reflective diffractive optic but could be formed within the volume or on an optical surface of a transmissive component coupled to the reflective surface. The grating itself could also be formed in a variety of ways including as a classically ruled reflection grating, a holographic surface relief diffraction grating, or a volume holographic grating. The orthonormal polynomials can also be defined over non-circular apertures as described for example in a paper by Mahajan, Virendra N. and Dai, Guang-ming, entitled "Orthonormal polynomials for hexagonal pupils," published in Opt. Lett., Vol. 31, No. 16, 2462-2464 (2006), the disclosure of which paper is hereby incorporated by reference in its entirety.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An imaging spectrometer comprising:
    an entrance aperture for admitting radiation over a range of wavelengths;
    a detector array;
    a primary reflective optic with optical power, a secondary reflective diffractive optic, and a tertiary reflective optic with optical power for collectively imaging the entrance aperture onto the detector array, wherein images of the entrance aperture are displaced along a spectrally registered dimension of the detector array; and
    at least one of the primary reflective optic, the secondary reflective diffractive optic, and the tertiary reflective optic includes a φ-polynomial optical surface with no axis of symmetry and represented by a function that depends on both a radial component and an azimuthal component.

2. The imaging spectrometer of claim 1 in which the φ-polynomial freeform optical surface is defined by a Zernike polynomial including a comatic component.

3. The imaging spectrometer of claim 1 in which the primary reflective optic, the secondary reflective diffractive optic, and the tertiary reflective optic each include a φ-polynomial optical surface with no axis of symmetry.

4. The imaging spectrometer of claim 3 in which the φ-polynomial optical surfaces of the primary and tertiary reflective optics are formed as reflective surfaces.

5. An imaging spectrometer comprising:
    an entrance aperture for admitting radiation over a range of wavelengths;
    a detector array;
    a primary reflective optic with optical power, a secondary reflective diffractive optic, and a tertiary reflective optic with optical power for collectively imaging the entrance aperture onto the detector array, wherein images of the entrance aperture are displaced along a spectrally registered dimension of the detector array; and at least one of the primary reflective optic, the secondary reflective diffractive optic, and the tertiary reflective optic includes a φ-polynomial optical surface with no axis of symmetry and represented by a function that depends on both a radial component and an azimuthal component, wherein individual points throughout an image field at the detector array are substantially diffraction limited with a root mean square wavefront error of 0.1 λ or less.

6. The imaging spectrometer of claim 5 in which the spectrally registered dimension of the detector array encompasses a range of wavelengths that is at least one and one-half times greater than a maximum range of wavelengths that would otherwise be possible to image onto the detector array with a similar set of imaging optics having spherical reflective surfaces achieving similar diffraction limited performance.

7. The imaging spectrometer of claim 5 in which the entrance aperture is a slit having a length and the slit is imaged onto the detector array in an orientation at which the length of the slit extends in a spatially registered dimension of the detector array orthogonal to the spectrally registered dimension of the detector array.

8. The imaging spectrometer of claim 7 in which the spatially registered dimension of the detector array encompasses a slit length that is at least one and one-half times greater than a maximum slit length that would otherwise be possible to image onto the detector array with a similar set of imaging optics having spherical reflective surfaces achieving similar diffraction limited performance.

9. The imaging spectrometer of claim 5 in which an optical pathway from the entrance aperture to the detector array has a volume that is at least one and one-half times less than a minimum volume that would be possible with a similar set of imaging optics having spherical reflective surfaces achieving similar diffraction limited performance.

10. The imaging spectrometer of claim 7 in which the imaging spectrometer has a numerical aperture NA, a slit length $L_s$, an angular dispersion $\theta_\omega$ of the wavelengths from the secondary reflective diffractive optic, and a spectral étendue of at least 9 millimeter degrees where the spectral étendue is calculated as a product of $NA \cdot L_s \cdot \theta_\omega$.

11. The imaging spectrometer of claim 1 in which the secondary reflective diffractive optic is formed as a Mangin mirror with a transmissive component having a convex φ-polynomial surface and a concave spherical surface that forms together with a reflective component a reflective grating.

12. The imaging spectrometer of claim 5 in which the spectrally registered dimension of the detector array encompasses a range of wavelengths that is at least two times greater than a maximum range of wavelengths that would otherwise be possible to image onto the detector array with a similar set of imaging optics having spherical reflective surfaces achieving similar diffraction limited performance.

13. The imaging spectrometer of claim 5 in which the spectrally registered dimension of the detector array encompasses a range of wavelengths that is at least three times greater than a maximum range of wavelengths that would otherwise be possible to image onto the detector array with a similar set of imaging optics having spherical reflective surfaces achieving similar diffraction limited performance.

14. The imaging spectrometer of claim 7 in which the spatially registered dimension of the detector array encompasses a slit length that is at least two times greater than a maximum slit length that would otherwise be possible to image onto the detector array with a similar set of imaging optics having spherical reflective surfaces achieving similar diffraction limited performance.

15. The imaging spectrometer of claim 5 in which an optical pathway from the entrance aperture to the detector array has a volume that is at least three times less than a minimum volume that would be possible with a similar set of imaging optics having spherical reflective surfaces achieving similar diffraction limited performance.

16. The imaging spectrometer of claim 5 in which an optical pathway from the entrance aperture to the detector array has a volume that is at least five times less than a minimum volume that would be possible with a similar set of imaging optics having spherical reflective surfaces achieving similar diffraction limited performance.

17. The imaging spectrometer of claim 7 in which the imaging spectrometer has a numerical aperture NA, a slit length $L_s$, an angular dispersion $\theta_\omega$ of the wavelengths from the secondary reflective diffractive optic, and a spectral étendue of at least 12 millimeter degrees where the spectral étendue is calculated as a product of $NA \cdot L_s \cdot \theta_\omega$.

18. The imaging spectrometer of claim 7 in which the imaging spectrometer has a numerical aperture NA, a slit length $L_s$, an angular dispersion $\theta_\omega$ of the wavelengths from the secondary reflective diffractive optic, and a spectral étendue of at least 15 millimeter degrees where the spectral étendue is calculated as a product of $NA \cdot L_s \cdot \theta_\omega$.

19. The imaging spectrometer of claim 1 in which, the φ-polynomial optical surface is a Zernike polynomial surface described by the following equation:

$$z = \frac{c\rho^2}{1 + \sqrt{1 - (1+k)c^2 p^2}} + \sum_{j=1}^{16} C_j Z_j,$$

where z is a sag of the surface, c is a vertex curvature, k is a conic constant, ρ is a radial component in the aperture, $Z_j$ is an $i^{th}$ Zernike polynomial, and $C_j$ is a magnitude coefficient of $Z_j$.

20. An imaging spectrometer comprising:
an entrance slit having a length $L_s$ for admitting radiation over a range of wavelengths;
a detector array;
a primary reflective optic with optical power, a secondary reflective diffractive optic, and a tertiary reflective optic with optical power for collectively imaging the entrance slit onto the detector array through a numerical aperture NA, wherein images of the entrance slit are displaced along a spectrally registered dimension of the detector array;
the reflective diffractive optic being arranged for dispersing the range of wavelengths through an angle $\theta_\omega$; and
at least one of the primary reflective optic, the secondary reflective diffractive optic, and the tertiary reflective optic includes a freeform optical surface with no axis of symmetry,
wherein the imaging spectrometer is further defined by a spectral étendue of at least 9 millimeter degrees where the spectral étendue is calculated as a product of $NA \cdot L_s \cdot \theta_\omega$.

21. The imaging spectrometer of claim 20 in which the spectral étendue is at least 12 millimeter degrees.

22. The imaging spectrometer of claim 20 in which the spectral étendue is at least 15 millimeter degrees.

23. The imaging spectrometer of claim 20 in which the ϕ-polynomial freeform optical surface is defined by a Zernike polynomial including a comatic component.

24. The imaging spectrometer of claim 20 in which the primary reflective optic, the secondary reflective diffractive optic, and the tertiary reflective optic each include a ϕ-polynomial optical surface with no axis of symmetry.

* * * * *